April 26, 1960

J. LOVE ET AL 2,934,370

BOLT TYPE FASTENERS

Filed Oct. 1, 1956

Inventors
JOHN LOVE
WILLIAM NEILSON

By *Lucke & Lucke*

Attorney

April 26, 1960  J. LOVE ET AL  2,934,370
BOLT TYPE FASTENERS
Filed Oct. 1, 1956  2 Sheets-Sheet 2

Inventors
JOHN LOVE
WILLIAM NEILSON

By *Lucke + Lucke*
Attorney

United States Patent Office 2,934,370
Patented Apr. 26, 1960

2,934,370

BOLT TYPE FASTENERS

John Love and William Neilson, Hillington, Glasgow, Scotland, assignors to K.A.C. Limited, Glasgow, Scotland, a British company Application October 1, 1956, Serial No. 613,053

3 Claims. (Cl. 292—142)

This invention concerns improvements in or relating to bolt type fasteners and more particularly concerns flush fitting fasteners of this type for use, for example, in securing inspection covers, cowlings, panels and the like on aircraft and for similar uses. It is one object of the invention to provide a fastener of the said type in which the bolt operating member is normally substantially flush with the surface of the surrounding structure (e.g., the skin of an aircraft or aircraft part) but which is readily accessible for use. It is a further object of this invention to provide a fastener of the said type in which the operating lever is capable of being held stowed in an out-of-the-way position so as not to be liable to accidental operation, for example, by catching on some extraneous object such as, for instance, the clothing of a pilot or other person, whilst being readily accessible for operation. The said operating lever will, of course, be arranged to occupy its stowed position when the bolt is in its "driven" or locking position.

It is a still further object of this invention to provide a bolt type fastener in which, when it is desired to withdraw the bolt, a kicker arm partially and positively projects the operating lever from its out-of-the-way position so that the operating lever may thereafter be readily manually manipulated to withdraw the bolt.

According to a further object of this invention there is provided a bolt type fastener in which a measure of lost motion between the operating lever and bolt is provided so that initial partial projection of the operating lever may occur without any actuation of the bolt, the force necessary to effect this partial projection thus being quite small.

It is yet a further object of this invention to provide a bolt type fastener in which the bolt is moved by said operating lever through the medium of rack and pinion means in such a manner that the mechanical advantage of the operating system is greatest at the commencement of the driving of the bolt and thereafter decreases.

A further object of the invention is to provide a bolt type fastener in which the bolt is moved by the operating lever through the medium of rack and pinion means in such a manner that rapid driving and withdrawal of the bolt may be achieved.

In order that this invention may more readily be understood, reference will now be made by way of example to the accompanying drawings in which.

Figure 1:
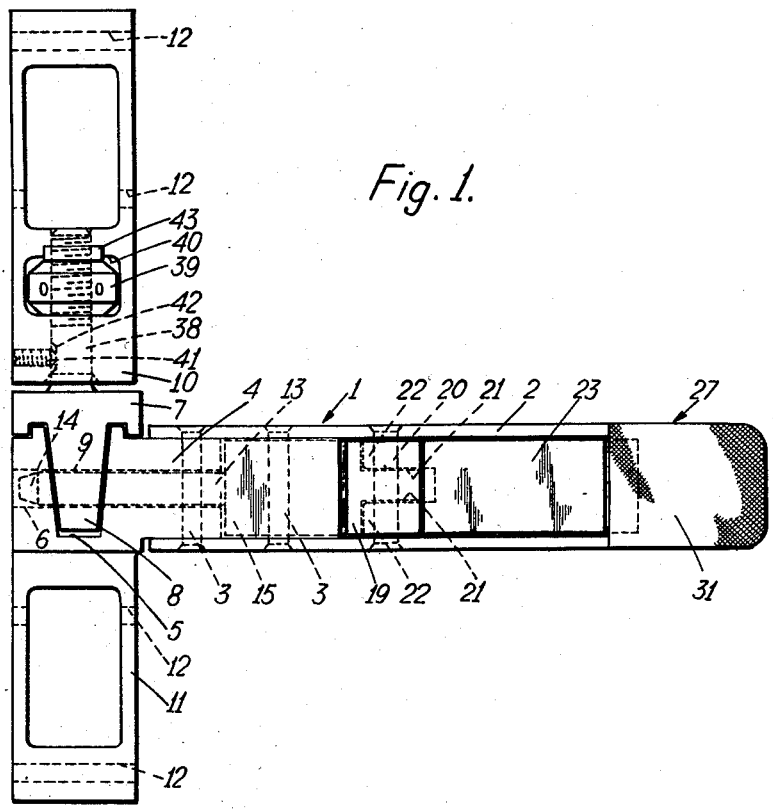
Figure 1 is a plan view of one embodiment of bolt type fastener according to this invention, the fastener being shown with the bolt in its locking position.
Figure 2:
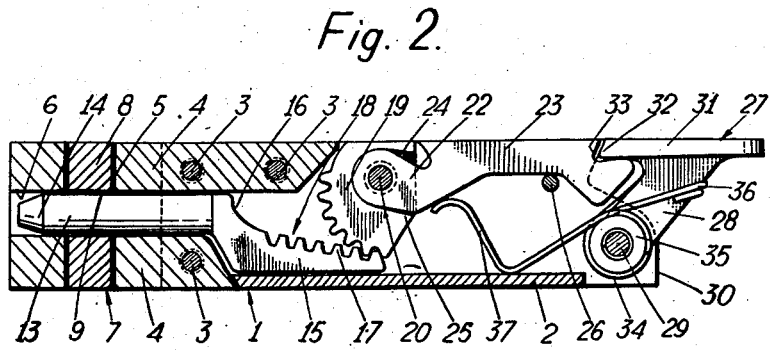
Figure 2 is a side elevation, partly in section, of the fastener of Figure 1.
Figure 3:
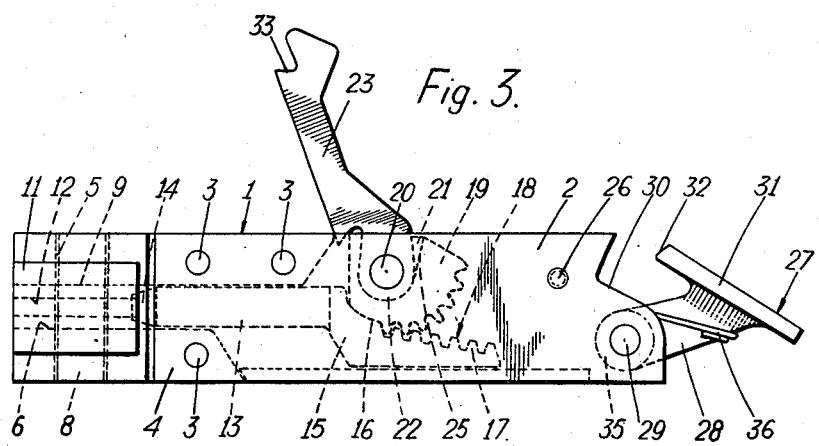
Figure 3 is a side elevation of the fastener of Figure 1, but with the bolt shown in its withdrawn position.

Referring to Figures 1 to 3 of the drawings, the bolt type fastener there illustrated comprises a housing 1 including a channel member 2 in one end of which is fixed by rivets 3 a guide block 4 projecting colinearly beyond one end of the channel member 2 and having a wedge-shaped recess 5 extending transversely of the length of the housing 1. A bore 6 is provided in the guide block 4 so as to pass transversely through the recess 5 and to lie with its axis on the longitudinal center line of the channel defined by the channel member 2, this bore 6 being hereinafter referred to as the "bolt guide."

For co-operation with the recess 5, there is provided a keep 7 which includes a tongue 8 of wedge shape and which is adapted to fit snugly into the recess 5, the tongue 8 being furnished with a transverse bolt hole 9 adapted to register with the bolt guide 6 in the block 4 and to receive the bolt of the fastener when this is moved to its locking position.

The keep 7 is adapted to be carried by one of the two parts or members to be connected together by the fastener, whilst the housing 1 is adapted to be carried by the other of such parts or members, the keep 7 being mounted on an attachment bracket 10 for mounting in the first named of said parts or members and the guide block 4 being provided with an attachment bracket 11 for mounting in the second named part or member, these two brackets 10 and 11 extending, as shown, in opposite directions at right angles from the longitudinal axis of the housing 1 and being provided with holes 12 for receiving bolts or the like for securing the brackets to the said parts or members.

In the bolt guide 6 in the block 4 of the housing 1 is mounted, as a close longitudinally sliding fit, a bolt 13, preferably of circular cross-section, as shown, and having a tapered nose 14, the bolt 13 being provided with a tail cranked laterally or downwardly from the bolt 13 and sliding along the web and between the side cheeks of the channel member 2 of the housing 1. The tail 15 has an inner surface 16 which slopes rearwardly away from the axis of the bolt and is provided with a series of teeth 17 resembling spur teeth and which constitute a rack 18 adapted for engagement with a toothed sector 19 mounted within the housing 1 for rotation about a pivot pin 20 extending perpendicularly between, and carried by, the side cheeks of the channel member 2, the sector 19 having its toothed periphery following a spiral path so that, at one end of its toothed periphery, the sector 19 is of considerably greater radius than at the other end thereof, the variation in radius of the sector matching the inclination of the toothed surface 16 of the rack 18 so that this continues to co-operate with the sector 19 as this is rotated about its pivot pin 20.

The sector 19 is recessed at its ends, as shown at 21, to receive arms 22 of the bifurcated inner or pivoted end of an operating lever 23 mounted on the pivot pin 20, the lever 23 being capable of limited pivotal movement about the pin 20 relatively to the sector 19 so that a limited amount of lost motion is provided between these two parts.

In the locking position of the bolt 13 as shown in Figures 1 and 2 and in which the bolt passes through the hole 9 in the tongue 8, the operating lever 23 lies in a stowed position between the side cheeks of the channel member 2 and projects along the housing from the pivot pin 20 in the opposite direction to the bolt 13, but does not project beyond the confines of the housing. Moreover, the operating lever 23, is preferably of such a width as to extend substantially the whole way between the said side cheeks of the member 2 and is adapted to be withdrawn by its free end from within the housing 1 through the open side of the channel member 2 and eventually, after moving relatively to the sector 19 by the amount of the lost motion, to become drivingly engaged with an abutment surface 24 on the recessed part of the toothed sector 19 so that, on further outward movement of the operating lever 23 taking place, the sector 19 is turned by the lever 23 about the pivot pin 20 so as to cause the bolt 13 to be moved, through the medium of the rack 18, from its locking position inwardly to a withdrawn position as shown in Figure 3. On moving the lever 23 inwardly from its outermost position, the lever first moves relatively to the sector 19 and then becomes drivingly engaged with an abutment surface 25 on the recessed part of the sector 19 so that, on further inward movement of the lever 23, the bolt 13 is driven from its withdrawn position to its locking position.

By making the teeth of the sector 19 follow a spiral path with the smallest radius at the end of the sector which first becomes operative in driving the bolt, i.e. moving the bolt to its locking position, the greatest mechanical advantage is provided at this stage in the locking of the bolt so as to ensure that the tapered nose 14 of the bolt will, as it enters the bolt hole 9 in the tongue 8 of the keep 7, draw the latter and the guide block 4 quickly and firmly into precise registration and permit the bolt 13 to slide fully home, the mechanical advantage between the sector 19 and the rack 18 progressively decreasing during the latter part of the driving movement of the bolt.

A transverse stop pin 26 is provided between the side cheeks of the channel member 2 to limit the inward movement of the operating lever 23 to such an extent as to ensure that the outer surface of the stowed operating lever 23 will, as shown in Figures 1 and 2, be flush with the free edges of the side cheeks of the channel member 2 and the rest of the corresponding surface of the housing.

In order to lock the operating lever 23 in its stowed position, a latch lever 27 is provided and comprises a central arm 28 pivoted on a pivot pin 29 carried by the side cheeks of the channel membre 2 near the base thereof (this base being cut away at 30 to permit free movement to the arm of the lever) and the arm 28 carries at its outer end a latch plate 31 which constitutes a finger piece which, when the operating lever 23 is in its stowed position, lies flush with the outer surface of this lever and has its front end 32 engaged in a rebate 33 in the free end of the operating lever so as to constitute a catch releasably holding the operating lever against the stop pin 26 and against accidental release.

The latch lever 27 is urged to its operating lever-retaining position by spring means in the form of a wire torsion spring 34 wrapped around bosses 35 provided one on each side of the lower end of the arm 28 of the latch 27, the spring 34 having a part 36 engaging behind the arm 28 and also having forward extensions 37 bearing upon the web of the channel member 2 and then extending from said web and engaging the inner surface of the operating lever 23 so as to urge the latter outwardly, such outward movement being normally restrained by the latch plate 31.

However, once the latch plate 31 is depressed so as to release the adjacent end of the operating lever 23, the spring 34 causes the operating lever 23 to be partially projected from the housing 1 to the extent permitted by the said lost motion, this being such as to ensure that the fingers of an operator may easily be inserted under the rebated or free end of the operating lever 23 to enable this to be pulled further from the housing. Once the said lost motion has been absorbed, outward movement of the operating lever by an operator will, as hereinbefore explained, cause the toothed sector 19 to rotate about the pivot 20 and cause the withdrawal of the bolt 13, the latter being in its locking position when the operating lever 23 is stowed within the housing.

Reverse movement of the operating lever from its outermost position to its stowed position will, after the lost motion has been taken up in the reverse direction to that already referred to, cause the toothed sector 19 to drive the bolt 13 into its locking position.

Advantageously, the keep 7 may, as shown in Figure 1, be adjustably carried by its mounting bracket 10. For this purpose, the keep 7 is shown as having a screw-threaded shank 38 aligned with the tongue 8 and which extends into the bracket 10 and is furnished with a nut 39 located against axial movement in an opening 40 in the bracket, the rotation of the nut 39 on the shank 38 causing adjustment of the keep 7 to or from the bracket 10. Rotation of the shank 38 in the bracket 10 is prevented by a grub screw 41 carried by the bracket 10 engaging a flat 42 on the shank 38. Unintentional adjustment of the keep 7 with respect to the bracket 10 may be prevented by an appropriate tab washer 43 serving to lock the nut 39 against rotation on the shank 38.

It is possible that in some circumstances, e.g. where the fastener is exposed to icing conditions, the operating lever would not automatically be partially projected even when disengaged by the latch plate, and, to ensure that depression of the latch plate will cause partial projection of the operating lever, the latch lever may be provided with a kicker arm adapted to engage the underside of the operating lever and force it outwardly from the housing as the latch plate is pressed inwardly.

Figure 4:
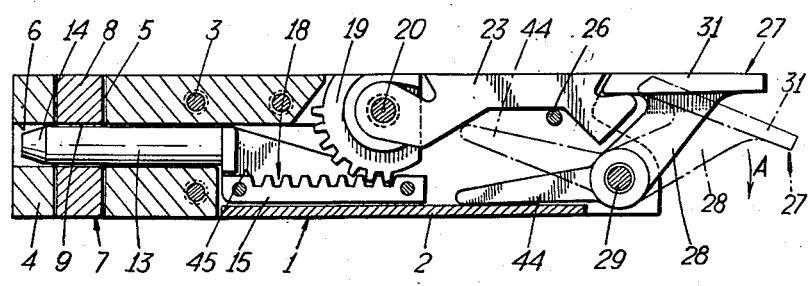
Figure 4 is a side elevation, partly in section, of a second embodiment of bolt type fastener according to this invention.

Figure 4 shows a second embodiment of fastener according to this invention which is similar to that of Figures 1 to 3, in which the latch lever is provided with such a kicker arm. This kicker arm is indicated by the reference 44 and is shown integral with the arm 28 of the latch lever and projecting from the pivoted end of the arm 28 inwardly of the housing 1. In the operating lever-retaining position of the latch lever shown in full lines in Figure 4, the kicker arm 44 is located adjacent the web of the channel member 2. When, however, the latch plate 31 is depressed in the direction of the arrow A, against the action of a spring similar to one spring 34, but omitted from this figure for purpose of clarity, the latch lever moves into the position shown in chain-dotted lines and the kicker arm 44 engages the underside of the operating lever 23 and forces it outwardly of the housing 1.

The fastener of Figure 4 also differs from that of Figures 1 to 3 in that, instead of the toothed sector 19 having a spirally arranged periphery and the rack 18 of the bolt 13 being provided by teeth arranged along an inclined surface 16, the sector 19 is of part circular form and the rack 18 is provided by teeth arranged along a rectilinear surface 45 of the bolt tail 15. In this embodiment the mechanical advantage of the operating system is constant during the locking or withdrawal of the bolt.

Figure 5:
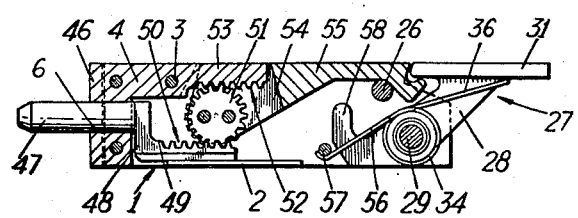
Figure 5 is a side elevation, partly in section, of a third embodiment of bolt type fastener according to this invention.

A third embodiment of fastener according to this invention is illustrated in Figure 5. In this embodiment, as in the two previously described embodiments, the fastener comprises a housing 1 including a channel member 2 in one end of which is fixed by rivets 3 a guide block 4 having therethrough a bolt guide 6 the axis of which lies on the longitudinal center line of the channel defined by the channel member 2. In the embodiment being described, however, the guide block is not formed to co-operate with a special keeper and projects slightly beyond one end of the channel member 2 where it is enlarged into a flange 46 for securing the fastener to a part or member on which it is to be used.

In the bolt guide 6 is mounted as a close longitudinally sliding fit a bolt 47 which is similar to the bolt 13 and which in its locking position projects outwardly beyond the flange 46, the bolt 47 having a laterally or downwardly cranked tail 48 which slides along the web, and between the side cheeks of the channel member 2, and which is provided with a rectilinear upper surface 49 provided with a series of teeth resembling spur teeth and constituting a rack 50. This rack 50 is adapted for engagement with a toothed pinion 51 located within the housing 1 for free rotation about a horizontal axis and the pinion 51 is also engaged with a second or fixed rack 52 provided by teeth in an extension 53 of the guide block 4 at the upper part of the housing 1 and lying parallel to the bolt rack 50.

The pinion 51 is rigidly secured at its ends to arms 54 of the bifurcated inner end of an operating lever 55, the latter being capable of pivotal movement with the pinion 51 about the axis of the latter. The operating lever 55 is adapted to be withdrawn by its free end from within the housing 1 through the open side of the channel member 2 and to rotate the pinion 51 which rolls along the fixed rack 52 and at the same time causes the bolt 47 to be moved, through the medium of its rack 50, from a driven or locking position inwardly to a withdrawn position, whilst movement of the operating lever 55 inwardly from its outermost position performs opposite functions to those just described. The employment of two racks and a floating pinion in this embodiment doubles the rate of movement of the bolt as compared with the embodiments of Figures 1 to 3 and of Figure 4.

As before, a transverse stop pin is provided to limit the inward movement of the operating lever and a latch lever 27, comprising a central arm 28 pivoted on a pivot pin 29 and carrying at its outer end a latch plate 31, is provided to lock the operating lever in its stowed position. Also as before, the latch lever is urged to its operating lever-retaining position by spring means comprising a spring 34 having a part 36 engaging behind the arm 28, but in the embodiment being described the spring 34 has forward extensions 56 hooked under a bar 57 extending transversely between the side cheeks of the channel member 2. As in the embodiment described with reference to Figure 4, the latch lever 27 is provided with a kicker arm, here indicated by the reference 58, which is adapted to engage the underside of the operating lever 55 when the latch plate 31 is pressed inwardly and to cause partial projection of the operating lever 55.

The bolt of the fastener just described may serve merely as a shear pin and be adapted to extend into a single hole, loop or the like in or on a co-operating member or structure or it may be used with a keep of the form described with reference to the embodiments of Figures 1 to 3 and Figure 4 or of any other suitable form.

Preferably, in each of the three embodiments above described, the housing and all the parts connected therewith and, where provided, the keep and the parts connected therewith, are adapted for mounting below the surface of the parts or structures on which they are to be used so that a flush finish is provided in which the latch plate, operating lever and the outer face of the housing is flush with the said surface.

Rack bolts as above described are particularly suitable for use on aircraft, but may, of course, be used for other purposes.

We claim:

1. A bolt type fastener comprising: a housing constructed for attachment to the structure on which the fastener is to be used; a bolt mounted for longitudinal sliding movement in said housing; a first toothed rack carried by said bolt; a second toothed rack fixed relative to said housing; a pinion meshing at one part of its periphery with the said first toothed rack and also meshing at another part of its periphery with said second toothed rack; an operating lever rigidly connected to the said pinion, said lever acting to rotate the said pinion to cause the latter to roll along the said second toothed rack and move the first toothed rack relatively thereto and thereby to move the said bolt relatively to the housing, said lever being capable of being stowed so as not to project beyond the confines of the housing when not in use for operating the bolt and the latter is in its locking position; stop means preventing further movement of the operating lever beyond its stowed position; a catch lever pivotal relatively to the said operating lever and having a part engageable in a recess in the said operating lever for releasably securing the said operating lever in its stowed position; spring means urging the said catch lever to its position in which it secures the said operating lever in its stowed position; and a kicker arm on the said catch lever and positioned so as to be spaced from the operating lever when the said catch lever is securing the operating lever in its stowed position, but so as to strike the operating lever when the catch lever is operated to release the operating lever and thereby act to partially project the latter.

2. A bolt type fastener comprising: a housing constructed for attachment to the structure on which the fastener is to be used; a bolt mounted for longitudinal sliding movement in said housing; a toothed rack carried by said bolt; an operating lever pivotal relatively to the said housing; a toothed member mounted in the fastener so as to coact with said operating lever and meshing with the said rack so that pivotal movement of the said operating lever causes longitudinal movement of the said bolt, movement of the said lever towards the housing causing movement of the bolt to its locking position and movement of the lever away from the housing causing movement of the bolt out of its locking position, the lever, when moved its maximum extent towards the housing being stowed within the confines of the housing; a catch member for releasably securing the said lever in its stowed position, such catch member being pivotal relatively to the housing and positioned so as to engage the operating lever when the latter is in its stowed position, but being capable of being pivoted away from the said lever to leave the latter free to be moved away from the housing; and a kicker arm positioned within the said housing and below the operating lever and pivotal relatively to the said housing with the said catch member, but so as to move towards, and strike, the operating lever to partially project the latter from the housing when the catch member moves away from the operating lever, the said kicker arm being, when the said catch member is securing the operating lever in its stowed position, spaced from the said operating lever whereby a substantial movement of the said catch member is necessary to cause the kicker arm to strike and partially project the operating lever.

3. A bolt type fastener according to claim 2 wherein said lever is capable of a limited amount of lost motion relative to said tooth sector.

References Cited in the file of this patent

UNITED STATES PATENTS

| | | |
|---|---|---|
| 517,512 | Angus | Apr. 3, 1894 |
| 616,877 | Baldry | Jan. 3, 1899 |
| 1,594,084 | Weymann | July 27, 1926 |
| 2,721,750 | Rudis et al. | Oct. 25, 1955 |

OTHER REFERENCES

Publication: "Automotive and Aviation Industries," May 1, 1944, page 27.